Dec. 15, 1931.  S. BLOOMFIELD  1,836,302
AUTOMOBILE SEAT COVER
Filed June 13, 1928   2 Sheets-Sheet 2
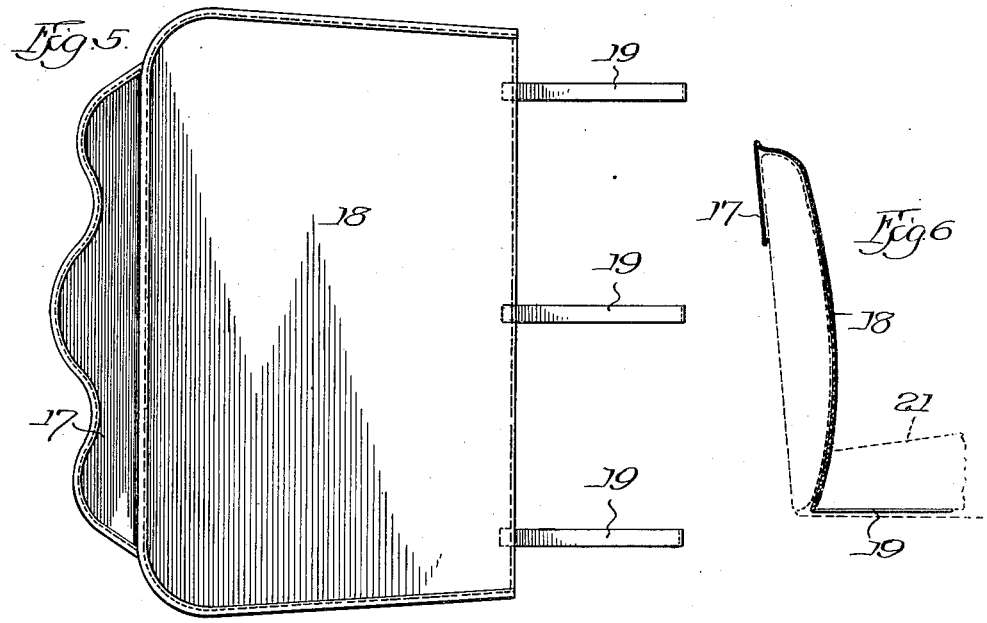
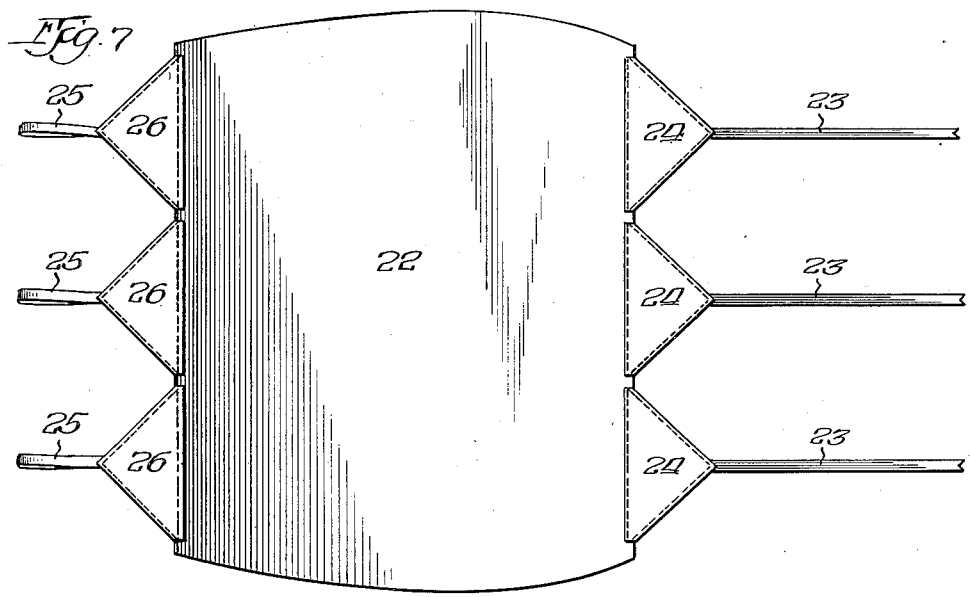

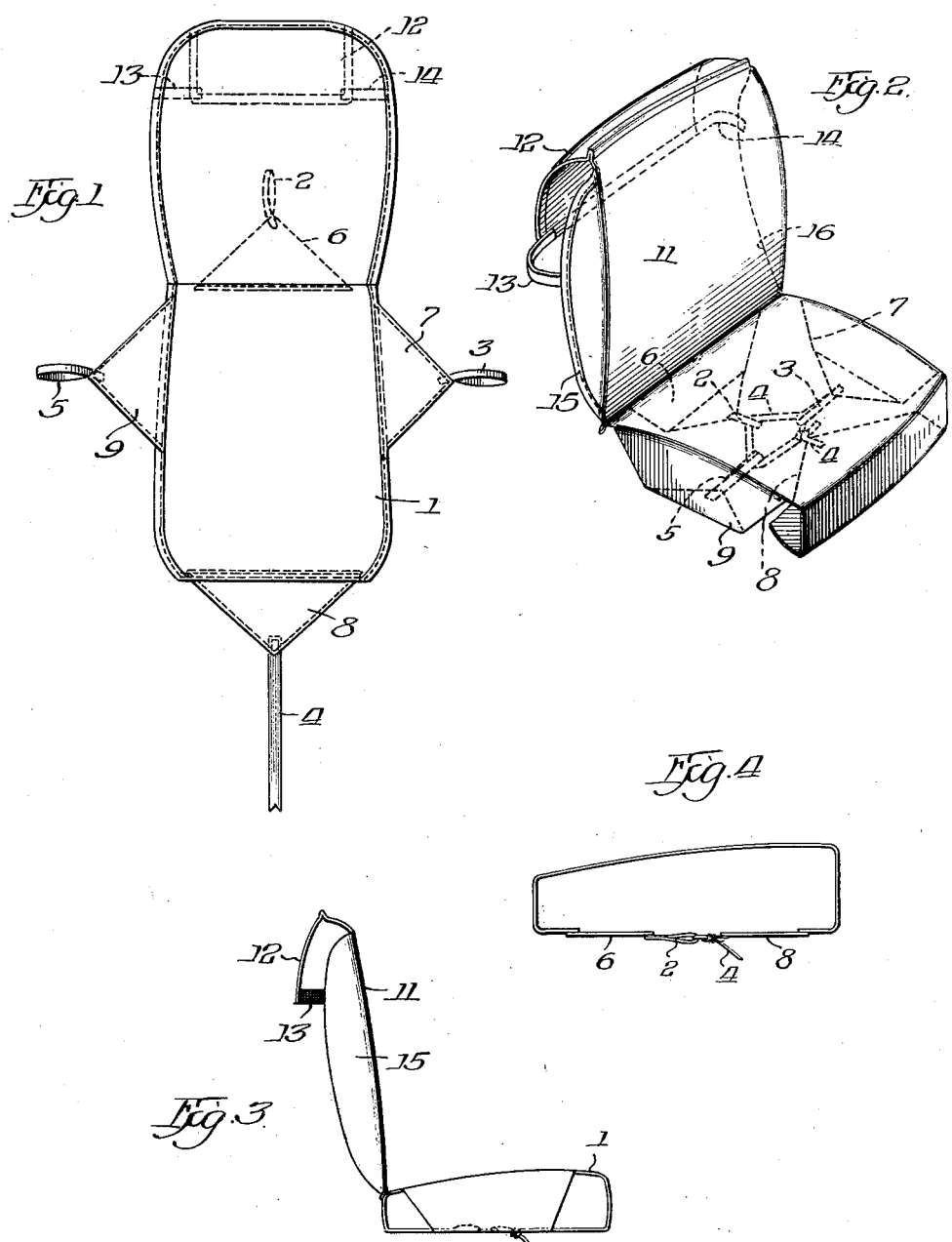

Patented Dec. 15, 1931

1,836,302

UNITED STATES PATENT OFFICE

SAMUEL BLOOMFIELD, OF CHICAGO, ILLINOIS

AUTOMOBILE SEAT COVER

Application filed June 13, 1928. Serial No. 285,127.

This invention relates to improvements in seat covers which may be utilized for covering many types of seats but are especially suited for covering the seats in automobiles.

In seat covers which have heretofore been used a great hindrance to their utility and attractiveness has been found to reside in the difficulty of securing the covers in a permanent taut relation and the tendency which these previous seat covers have hitherto had in buckling along their margins with resultant unsightly appearance and increased tendency to localize the wear upon them at the buckled and wrinkled places.

This invention provides seat covers which can easily and quickly be connected to the various seat members and drawn tautly into operative position with the assurace that their marginal portions cannot buckle or wrinkle. No tacks or snap fasteners are needed, and no mutilation of the automobile seat will occur. No cost will be incurred when installing these covers as anyone can install them quickly without instructions. The new advantages arising from this invention are obtained not at increased expense but through a simplified construction which makes these new advantages available at costs lower than have hitherto been attainable in the construction of seat covers.

Another important advantage arising from the construction employed in these seat covers is that they may be adapted to more than one seat member, whether it be a back wall or a seat itself, and these covers may also be applied to different types of seats, whether they be folding seats commonly found in coaches of the present day automobiles or whether they be the rigid front or rear seats which are in vogue in the present day sedan.

One of the objects therefore of this invention is to provide seat coverings having means for tying them tautly and securely with greatly facility upon their respective seat members and adapted to hold the marginal edges, which are liable to be wrinkled, in such a snugly secured relation that wrinkling is impossible.

Another object of this invention is to provide seat covers with means for tying them which means are especially adapted for quick tying and easy release.

Another object of this invention is to provide a type of seat cover which may be applied to folding seats, the means for tying the covers onto the seat members being adapted to hold the marginal edges snugly and secured against wrinkling and yet so constructed that the covers may be firmly secured to the seat members with a few tie elements which are easily secured together.

Another object of this invention is to provide seat coverings having tie elements which are adapted to hold the covers taut upon their seat members with their marginal portions snugly secured agains wrinkling, the tying means being so adapted that the cushions of the seat members may be somewhat compressed easily during the tying so that the resiliency of the seat members themselves will be utilized to keep the seat coverings and their tie elements normally taut.

Other objects, advantages and capabilities are inherently possessed by this invention and will later become apparent.

In the drawings,

Fig. 1 shows a plan view of a seat covering which is especially designed for application to a foldling seat;

Fig. 2 shows the same covering occupying a position that it would have when placed upon such a folding seat;

Fig. 3 is a side elevation of the seat cover which is shown in Fig. 2 as it would appear in use.

Fig. 4 is a vertical, central, sectional view of a seat cover portion as applied to a seat member alone.

Fig. 5 is a plan view of a back cover adapted for covering a rigid back wall of an automobile seat;

Fig. 6 illustrates the removable seat cushion as utilized for pressing down on the straps of the back cover shown in Fig. 5.

Fig. 7 is a plan view of a cover portion adapted to be tied about a seat member which member may be either a back cushion or a seat cushion.

Referring in greater detail to the drawings:

The covering shown in Figs. 1, 2 and 3 is preferably of unitary construction and is intended to cover the back cushion and the seat cushion of a folding seat. The seat cover portion 1, has connected to its margins the tie elements 2, 3, 4 and 5. Each of these tie elements has an enlarged portion numbered respectively 6, 7, 8, and 9.

Referring to Fig. 2, it will be observed that when this seat cover portion is placed upon the seat cushion of the seat member of a seat these tie elements are brought around and alongside of the surface opposite the wearing surface of the seat member and assume the positions shown by the dotted lines in Fig. 2. The tie elements on three of the sides terminate in loops as shown in Fig. 1 while the other tie element 4 terminates in a strap which may be run through the other three loops and be tied back upon itself as is indicated in Fig. 2.

The nature of the connection of these tie elements to the marginal portions of the cover enable these tie elements to hold the marginal portions of the seat cover snugly and flatly against the seat cushion at all times. The continuity of the connection between the tie element and the seat cover and the manner in which these tie elements pull upon the various portions of the seat cover will prevent any edge of the seat cover from buckling or wrinkling. Where in the past any one may have attached a number of narrow strips directly to the margins of a seat cover it would necessarily follow that continued use of the covering would cause a buckling and wrinkling between the positions at which the tie straps were connected to the seat cover. These wrinkles were not only unsightly but they always collected an undue proportion of dirt which made them even more unsightly and they also became subject to increased and undue wear along their creases. Too frequent laundering was therefore necessary and the life of the seat covers was very materially reduced by this wrinkling.

The construction of these tying elements also enables one to pass the running strap 4, through the other loops and thereafter compress the cushion as the running strap is being drawn more and more tightly through the loops. It becomes then a simple matter to tie this running strap back upon itself while the cushion is still under compression. When the knot is made and compression is released it is found that the springiness and the resistance to compression on the part of the cushion will cause the said cover and its tie elements to be held taut at all times.

When applying the covering shown in Fig. 1 to a folding seat one will first slip the back cover down upon the back wall of the seat before attempting to tie the seat cover to the seat cushion. The back cover has a main cover portion 11 to which is connected a pocket member generally indicated as 12. This pocket member will preferably have expansible straps 13 and 14. These straps may be made of any suitable elastic material. This pocket member may also be so designed as to eliminate the necessity of elastic members therein. The straps 13 and 14 which are shown in this preferred embodiment of the invention are connected to flaps 15 and 16 which extend around the lateral corners of the back cushion.

When this seat covering is placed upon a folding chair and the tie elements of the seat cover are drawn together the tie element 2, and its enlarged portion 6, will draw the back cover downwardly and snugly across the wearing surface of the back seat element. At the same time this tie element 2 will cooperate with the other tie elements of the seat cover portion to hold that portion snugly on the seat cushion.

The covering shown in Fig. 5 is provided with a flap 17, which is to be engaged over the top edge of a back cushion portion 18 to which are connected the straps 19. These straps may be pushed down and held securely in place by the seat cushion 21 shown in Fig. 6. In Fig. 7, a covering is shown which may be applied preferably to a seat cushion. It has a main body portion 22 to which are connected tie elements similar to those shown in Fig. 1. These tie elements consist of the straps 23 each of which is connected respectively to an enlarged portion 24 and on the opposite marginal edge of this covering 22 are shown the tie elements which have loops 25 which are connected to enlarged portions 26. It is apparent that when this covering is placed upon a seat cushion and the tie elements are passed underneath the cushion the pulling of the straps 23 through the loops 25 will enable one to compress the seat cushion so that when the straps are eventually tied the resistance to compression offered by the seat cushion will keep this covering taut at all times. The tie elements through their enlarged portions are connected throughout almost the entire length of the respective corresponding marginal portions of the seat cover to which they are attached. This manner of connection therefore enables the tie elements to prevent buckling and wrinkling of the seat cover, as has been explained above. Various materials may be used in making the seat coverings, such as some of the well known cloth coverings or straw may be used. Also the materials may be selected to allow reversing of the coverings.

While in Figs. 1 and 2 the disclosure shows a unitary seat covering in which the pocket member fits down over the back cushion, it may be desired at times to have the pocket member a part of the seat portion rather than of the back portion and to have the tie elements tied behind the back cushion rather than underneath the seat cushion. In other cases it may be desired to have a pocket member to slip over the back cushion and another pocket member to slip over the seat cushion. All of these modifications are comprehended in this invention.

It should be understood that the disclosure made in this application illustrates only preferred embodiments of the invention which have been selected for the purpose of illustrating the invention and that the scope of this invention includes other embodiments and modifications in addition to these disclosures.

Having shown and described my invention I claim:

1. A unitary flexible fabric cover for a chair comprising a back cover having laterally extending flaps to be bent around the sides of a chair back, a longitudinal extension of said back cover for extending over and behind the top of a chair back, expansible straps connecting the extremity of said extension with said flaps to form therewith an expansible pocket, and a seat cover having one edge thereof connected continuously to the bottom edge of the back cover and having lateral flaps for extending around and underneath the sides of the chair seat for completely inclosing said sides, a front end flap on said seat cover for extending around and beneath the front edge of the seat, a triangular tab continuously connected to substantially the entire line of joinder of the back and seat covers, said tab and two of the last said flaps having loops and the other flap having a running strap to be passed through said loops to thereby draw the tab and three flaps toward each other for tautly securing the seat cover, back cover and pocket extension snugly on the chair.

2. A seat cover comprising a seat portion and a back portion, the back portion having side flaps adapted to overlie the sides of a seat back, an extension from the upper end of the back portion adapted to extend over the top and downwardly along said back and straps connecting the margins of said extension with said side flaps, the seat portion being provided at the front and rear and both sides with triangular flaps adapted to fold beneath the side, and means for connecting the four flaps together beneath the seat whereby said cover is maintained in position.

3. A seat cover comprising a seat portion provided at the front, back and sides with flaps adapted to be folded around and beneath the seat, each flap being equipped with provisions whereby the four flaps may be secured together to hold the seat portion in position, a back portion secured to the rear edge of the seat portion adapted to extend upwardly over a seat back and provided with an extension extending over the back and downwardly along its rear face, side flaps adapted to cover the sides of the back, and yieldable straps attaching the extremities of said extension to said side flaps.

In witness of the foregoing I affix my signature.

SAMUEL BLOOMFIELD.